United States Patent Office 3,237,404
Patented Mar. 1, 1966

3,237,404
RE-EXPANSION GAS TURBINE ENGINE WITH POWER TRANSFER BETWEEN TURBINES
Eugene E. Flanigan, Bloomfield Hills, and Robert W. Guernsey, Rochester, Mich., Jerry R. Roan, Plainfield, Ind., and Richard M. Zeek, Utica, Mich., assignors to General Motors Corporation, Detroit, Mich., a corporation of Delaware
Continuation of application Ser. No. 178,121, Mar. 7, 1962. This application May 3, 1965, Ser. No. 456,031
22 Claims. (Cl. 60—39.16)

This application is a continuation of our application Serial No. 178,121, filed March 7, 1962.

Our invention pertains to gas turbine engines. It is particularly directed to improving the efficiency of engines of a gas-coupled or free turbine type; that is, engines which have two or more independently rotatable turbines. This is a preferred type of gas turbine for many applications such as propulsion of automobiles, trucks, boats, and aircraft. An engine of the free turbine type includes a compressor, combustion apparatus, and a turbine driving the compressor, these constituting a gas generator or gasifier. The gas generator may have two spools or compressor-turbine combinations. The engine also has a power or load turbine energized by the hot gases from the gas generator which drives an external load.

One great advantage of free turbine engines is flexibility, since the speed of the output shaft may vary widely without affecting the operation of the gas generator. The power output of the engine may be varied by changing the fuel supply to vary the gas energy delivered to the power turbine, but variations in speed of the power turbine to accommodate the load are not followed by the gas generator, which may operate at an efficient speed. The power turbine may even be stalled, and thus may be coupled directly to the driving wheels of a vehicle. For such service, this is a desirable characteristic.

Engines of the free turbine type share with single shaft turbines one important handicap—poor fuel economy at light load. The specific fuel consumption of a regenerative gas turbine is no higher than diesel engines or gasoline engines at full load. However, in light motor vehicles, the output of the engine is likely to be less than half full power most of the time. High fuel consumption under these conditions greatly increases the overall fuel cost.

Figure 6:
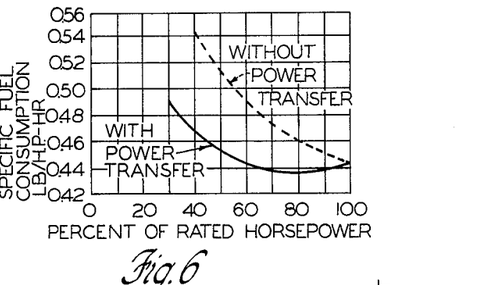
FIGURE 6 is a plot showing the effect of power transfer on fuel economy.
Figure 8:
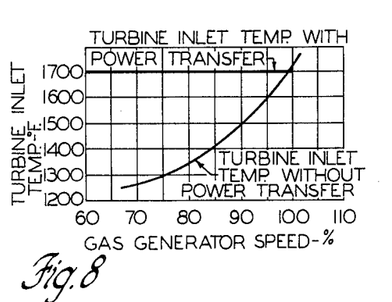
FIGURE 8 is a chart showing the effect of power transfer upon turbine inlet temperature.

This invention is directed to improving the specific fuel consumption of the engine under part-load conditions by extracting power from the gas generator turbine and delivering it to the load. Thus, to an extent, the gas generator turbine is teamed with or parallel with the power turbine. By suitable control of such transfer of power, sensational improvements in part-load fuel economy can be had. For example, starting with a regenerative engine having a full load BSFC of 0.44, a half-load BSFC of 0.52, and quarter-load BSFC of 0.62; adding power transfer according to this invention to the engine, the full load BSFC remains as before but half-load BSFC is slightly under 0.44, and quarter-load only about 0.51. The curves of FIGURE 6 illustrate this. The reason for this improvement may be summarized as follows: In the ordinary free turbine engine, to reduce power output below full power it is necessary to reduce fuel flow and, therefore, turbine inlet temperature of the gas generator is reduced. Operation at low temperature reduces the efficiency of the gas generator. While pressure ratio of the gas generator also decreases because of reduction of speed, the efficiency of a regenerative engine is not affected much by this. By extracting useful work from the gas generator, the turbine temperature can be maintained at the normal or full load temperature, as illustrated in FIGURE 8.

While the principal purpose of the invention is to improve part-load fuel economy, an engine incorporating the invention has other significant advantages. The torque transmitting coupling between the two turbines may eliminate the need for a free turbine governor, thus simplifying the fuel control. It also makes push starting of a vehicle driven by a free turbine or gas-coupled engine possible. The coupling between the two rotors may include provisions for dynamic braking of the vehicle.

We realize that mechanical coupling arrangements of one sort or another between the turbines of a free turbine engine have been proposed, either to allow the gas generator (or, more specifically, the compressor) to act as a dynamic brake on the power turbine shaft, or to transfer power from the gas generator to the output shaft under conditions such that the gas generator turbine tends to overrun the power turbine. So far as we are aware, however, there has been nothing providing the advantages of our invention or including the principles thereof, that is, acting to maintain a high substantially constant turbine temperature. The nature of the invention and its advantages will be apparent to those skilled in the art from the succeeding detailed description of preferred embodiments of the invention.

Referring to the drawings.

Figure 1:
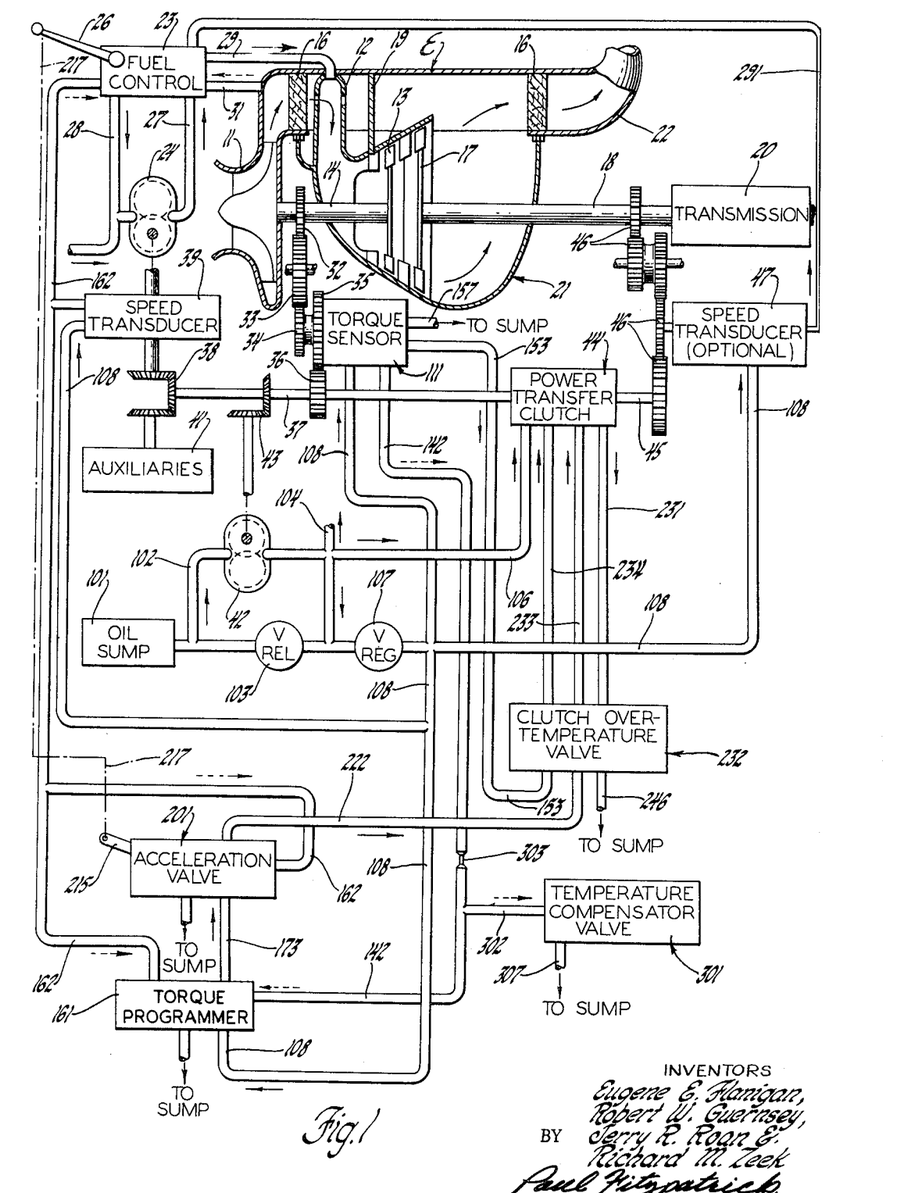
FIGURE 1 is a schematic diagram of a regenerative free turbine power plant with power transfer, including the controls.

Referring first to FIGURE 1, the engine E is preferably, although not necessarily, a regenerative engine of the known type described in U.S. patent applications Serial No. 559,475, filed January 16, 1956, now abandoned; Serial No. 760,211 (Patent No. 3,077,074), filed September 10, 1958; and Serial No. 127,079 (Patent No. 3,116,-605), filed July 13, 1961; all of common ownership with this application. These engines, developed and exploited by the assignee of this invention, have been reported upon extensively in the technical literature. For this reason, and also because the present invention may be included in engines of various structure, it is unnecessary to enlarge upon details of engine structure. As shown schematically in FIGURE 1, the engine E includes centrifugal compressor 11, combustion apparatus 12, and a first turbine 13 coupled by a shaft 14 to the compressor. These structures are the basic elements of the gas generator. The compressed air is discharged from compressor 11 through a matrix 16 of a radial flow rotary regenerator into the combustion apparatus 12. The exhaust gas from the turbine 13 flows through a second, load, or power turbine 17 supported on a power output shaft 18. Turbine 17 exhausts through the matrix 16 to the rear of a bulkhead 19 which divides the matrix into air flow and gas flow zones. Shaft 18 may be coupled to the load by a suitable gearbox or transmisison 20. The engine is enclosed in a case or housing, indicated generally at 21, to confine the motive fluid. The exhaust gas, after passing through the matrix 16, may be discharged to atmosphere through an exhaust passage 22. This schematic shows only a single regenerator. Preferably, however, two are employed, disposed symmetrically in parallel as shown in the above-mentioned applications.

The primary control of the engine is of fuel flow to the combustion apparatus. Any appropriate fuel control 23 supplied with fuel by a pump 24 may be employed. Suitable fuel controls are well known, and including this invention in an engine does not require any additions to the fuel control.

Ordinarily, the vehicle operator controls the engine by a hand lever or foot pedal, such as a throttle lever 26 connected to the fuel control. The fuel supplied by the pump 24 is delivered through line 27 to the fuel control, and the excess is returned to the pump inlet through line 28, the engine fuel requirement being delivered to the combustion apparatus through line 29. Such fuel controls ordinarily include one or more fuel regulating or metering valves, which are variable throttling valves, and a head regulating valve which controls the metering pressure differential. They may include relief valves and various limiters or safety valves. Fuel flow may be regulated to prevent overspeed, overtemperature, or lean blow-out but ordinarily is primarily responsive to some such suitable parameter as compressor discharge pressure. As indicated here, a line 31 pipes compressor discharge pressure into the fuel control. Such controls may include metering means responsive to engine speed and normally include governors to provide normal control or overspeed protection, or both. This matter will be referred to later.

As so far described, there is a power plant comprising any suitable free turbine engine and any convenient fuel supply and control means therefor. The pump 24 and other engine auxiliaries are ordinarily driven by the gas generator. A chain of gears for this purpose may include a driving gear 32 on shaft 14, idler gear 33, coaxial united gears 34 and 35, and a gear 36 on a main power transfer and accessory drive shaft 37. Shaft 37, through power take-off gearing 38 and the obvious shafting, drives pump 24, a gas generator speed transducer or responsive device 39, and miscellaneous engine or vehicle auxiliaries indicated by the block 41. An oil pump 42 is also driven by the power take-off shafting and gears 43.

With respect to the power transfer function, shaft 37 is connected by clutch 44 to shaft 45 and through a chain of transfer gears 46 to the power turbine output shaft 18 and transmission 20. A speed transducer 47 for indicating or control purposes may also be coupled to the power turbine by gears 46.

Figure 2:
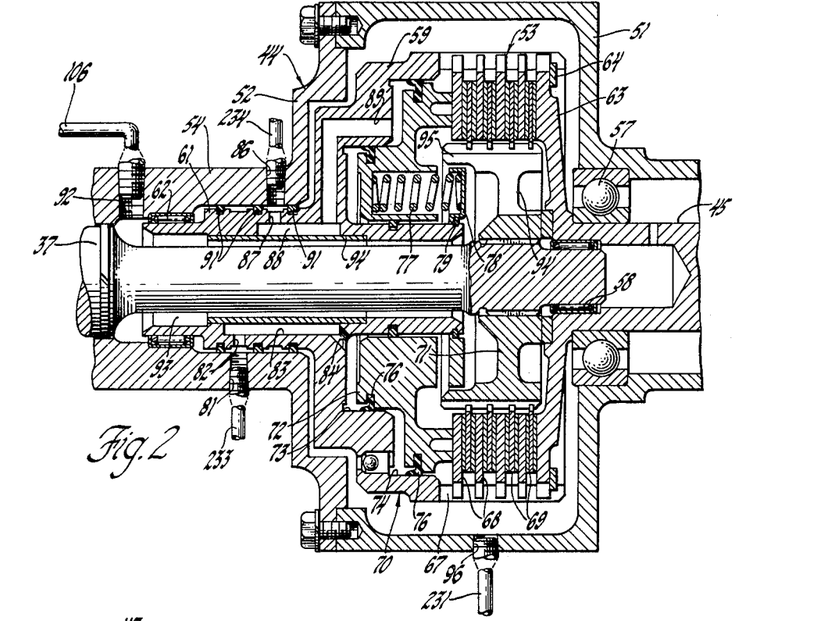
FIGURE 2 is a sectional view of a power transfer clutch.

The power transfer clutch 44 is shown in detail in FIGURE 2. It is preferably a multi-plate friction clutch in which the engaging force and, therefore, the torque capacity, is determined by a hydraulic piston. As will become apparent, such a clutch is merely representative of various controllable torque-transmitting mechansims that may be employed to couple the shafts 14 and 18. The clutch described is provided for both power transfer and braking. Clutch 44 comprises a main housing or case 51 and a front cover 52 suitably fixed together to provide a housing for the multi-plate friction clutch 53 and supports for the driving and driven elements thereof. The input shaft 37 is supported by bearings, not illustrated, in the cylindrical forward portion or nose 54 of the cover 52.

The output shaft 45 is supported by a ball bearing 57 in the case, and the rear end of the input shaft is supported in the output shaft by needle bearing 58. The clutch 53 includes a cage 59, the forward end of which constitutes a stub shaft 61 supported by needle bearing 62 in the cover portion 54. The clutch friction elements are contained by cage 59 and a flange 63 on the forward end of output shaft 45, this flange fixed in the cage by an expanding snap ring 64. The cage 59 is slotted axially as indicated at 67 to receive splines on clutch plates 68. Flange 63 also serves as a clutch plate. Friction disks 69, disposed between the clutch plates, are internally splined for engagement with splines on the outer surface of an inner clutch drum 71 coupled to shaft 37 by splines. Thus, the clutch plates must rotate with the output shaft and the friction disks with the input shaft, and both are slidable axially of the shafts.

The clutch is engaged by a double hydraulic motor 70 which has two effective pistons defined by a single annular stepped piston 72. This piston is slidable in a stepped cavity bored in the cage 59 which defines an inner or power transfer cylinder 73 and an outer or brake cylinder 74. While it is not necessary to have two cylinders, it is preferable to provide a larger cylinder area for braking the load than for power transfer, since the torque during braking may be five or more times the maximum power transfer torque. The rear face of the piston engages the forward clutch plate 68. Seals 76 are provided on the piston 72 in the cylinders 73 and 74. The cylinders are single-acting, and clutch-releasing force is provided by a number of compression springs 77 received in sockets in the piston and in pockets in a spring abutment ring 78 retained on the cage 59 by a snap ring 79.

Oil under pressure is supplied to the power transfer cylinder 73 through a port 81 in the cover and passages 82, 83, and 84 in the cage 59. Oil under pressure is supplied to the brake cylinder 74 through a port 86 in the cover and passages 87, 88, and 89 in the cage. The ports are sealed off by piston ring seals 91. Since the clutch is operated as a slipping clutch, a flow of cooling oil is provided. This oil is supplied through a port 92 and flows through the annular passage 93 between the shaft 37 and the cage (defined in part by sleeve 94 in the cage) to the inner clutch drum 71. It then flows through gaps or notches 95 in the rim of the inner clutch drum, between the clutch plates and the friction disks (which are grooved), through the slots 67 in the cage into the housing 51, and is vented through a port 96. The cooling oil is supplied under pressure and circulation is aided by centrifugal force due to rotation of the clutch.

The torque transferred by the clutch will be closely proportional to the engaging force exerted by piston 72. This, in turn, is proportional to the sum of the products of the pressures in the cylinders 73 and 74 by the effective piston areas minus the force of springs 77. The cylinder 74 is used only to provide a high degree of friction to transmit relatively large amounts of power from the power turbine to the compressor to brake the output shaft. Cylinder 73 is supplied fluid under controlled pressure to determine the amount of torque transmitted in normal operation of the turbine at part-load. It is also energized to assist in providing clutching force for braking, along with cylinder 74.

Returning to the schematic diagram of FIGURE 1, the oil which is supplied to clutch 44 is circulated under pressure by pump 42 driven by the gas generator. This oil is drawn from a source such as a sump 101 through a line 102 and the pressure is limited by a suitable relief valve 103. Pump 42 may supply oil for engine lubrication through line 104 or it may be independent of the lubricating system. The clutch cooling oil is supplied through line 106 to port 92 of the clutch 44. Pump 102 also supplies oil for control and servo purposes, the pressure of which is held constant by a constant pressure regulating valve 107 which discharges into a supply line 108.

Figure 3:
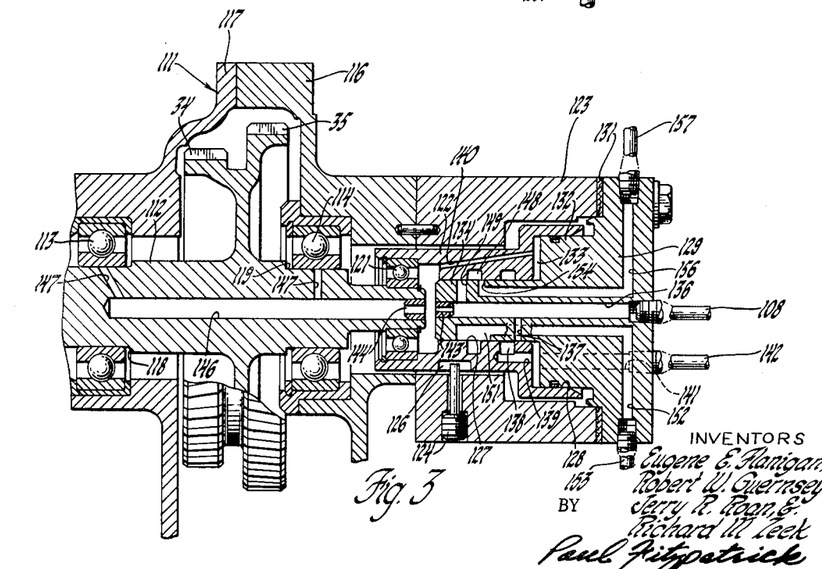
FIGURE 3 is a sectional view of a torque sensor.

One of the basic elements of control of power transfer in the system of FIGURE 1 is a torque sensor 111, illustrated in FIGURE 3. The torque sensor responds to the torque transmitted through the intermediate gears 34, 35 from the gas generator turbine to the several auxiliary and power transfer shafts. Gears 34 and 35 are integral with a torquemeter shaft 112 mounted in ball bearings 113 and 114. Bearing 114 is mounted in a torque sensor body 116 and bearing 113 in a cover 117. The gears 34 and 35 are helical and of opposite hand helix angles so that an axial thrust is developed on the shaft 112 proportional to the torque transmitted. Shoulders 118 and 119 on the shaft may engage the inner races of the bearings 113 and 114, and permit some axial movement of the shaft. Any such axial movement is communicated through a ball thrust bearing 121 to an openended cylinder 122 reciprocably disposed in a block 123 fixed to the body 116. A setscrew 124 engaging a keyway 126 in the cylinder prevents rotation of the cylinder. The cylinder 122 has a stepped internal bore with a smaller diameter portion 127 and a larger diameter portion 128. The cylinder is guided on a fixed stepped piston 129 having a flange which is fixed to the right end of block 123 with a gasket 131 between. The fixed piston 129 includes a larger diameter portion 132 which acts as a pistonut with the portion 128 of the cylinder, the two defining a pressure chamber 133 between them. The smaller diameter portion 134 of the piston constitutes one member of a valve, the other member of which is the cylinder 122.

Controlled pressure servo oil supplied by regulating valve 107 through line 108 enters the torque sensor through a port and passage 136 which communicates through a small radial port 137 with the outer surface of the piston. A groove 138 in the cylinder connects through a port 139 with the chamber 133. The helix angles of gears 34 and 35 are such that transfer of power from the shaft 14 through gears 34 and 35 biases the shaft 112 to the right as illustrated and tends to contract the chamber 133. This rightward movement permits variable registry between port 137 and groove 138 to supply fluid under pressure to chamber 133 to resist the torque-induced thrust. The pressure in chamber 133, therefore, is proportional to torque. An orifice passage 140 bleeds chamber 133 at a slow rate continuously and allows the pressure in the chamber to decrease when the torque is reduced. A passage 141 through piston 129 provides the output of pressure through a line 142. This pressure provides the torque input to means which control the power transfer clutch 44.

Passage 136 terminates in a jet 143 from which oil is squirted through a sleeve 144 into a central bore 146 in the torquemeter shaft 112. Radial passages 147 carry the oil to the axially slidable journals of the shaft in the bearings 113 and 114. Since normal torque urges cylinder 122 toward piston 129, a reversal of torque, which occurs when the external load device tends to drive the power turbine and causes it to outrun the gas generator turbine, urges the shaft 112 and cylinder 127 to the left as illustrated. This movement is not opposed by hydraulic pressure, but is terminated when abutment 118 engages the thrust bearing 113. This movement of the cylinder in response to reverse torque brings a recess 148 in the cylinder 122 into registry with a radial port 149 in the piston supplied with pressure oil through passage 136. Recess 148 always registers with an axially elongated port 151 in the piston which is connected by a passage 152 to an output line 153 which energizes the clutch 44 for engine braking. When the torque is in the normal direction, the position of cylinder 122 is such that passage 152 and port 151 communicate through groove 148 with a drain port 154 in the cylinder which leads through passage 156 and a line 157 to the sump.

Under torque reversal, port 138 is moved out of registry with port 137 and pressure in chamber 133 drops to zero. Thus, a no torque signal (zero pressure) is transmitted through line 142. This signal acts through the torque programer (to be described) to cause full oil pressure to be applied in clutch cylinder 73 in addition to cylinder 74. The maximum piston area is thus available to lock up the clutch so as to transmit a torque corresponding to a desired large fraction of engine power rating, such as about 60% thereof.

In normal running, the power transfer clutch 44 is controlled to transmit a desired value of torque by comparing the measured torque from the torque sensor 111 with a desired torque or power transfer signal from a torque programer 161. The torque programer is an automatic valve which controls the power transfer clutch piston in response to inputs of actual torque output of the gas generator and actual speed of the gas generator. It acts upon oil supplied by pump 42 to clutch 44. The torque sensor pressure is transmitted through line 142 as explained above. The speed signal is a fluid pressure signal transmitted through line 162 from the speed transducer 39, the structure of which will be described. Servo oil at controlled pressure is supplied through line 108.

The torque programer 161 (FIGURE 4) comprises a valve body 163 and a control cylinder 164 mounted rigidly together. A cylinder 166 in the valve body mounts a servo oil control spool 167 and a cam follower 168. A compression spring 169 is mounted between the valve spool and cam follower. Servo oil from line 108 enters the valve through port 171 which intersects the wall of bore 166 in position to be variable throttled by valve spool 167. An outlet port 172 is connected through a line 173 and other devices, to be described, to the power transfer cylinder 73 of clutch 44. The torque sensor signal pressure in line 142 is admitted to a chamber 173 where it biases the valve in the direction to cut off clutch servo oil. This bias is opposed by the force of spring 169. The cam follower 168 includes a follower roller 174 and a clevised end 176 which straddles a cam 177. This cam lies between a piston 178 and a guide and spring seat 179, all of these being integral. The cam 177 has a suitably contoured surface which engages the follower 174. Cam 177 is guided in a bore 182 in the cylinder body 164 by piston 178 and spring seat 179. It is biased upwardly, as illustrated, by compression spring 183 and biased downwardly by the gas generator speed signal supplied through line 162 into the chamber 184 above the piston 178. A head 186 closes this chamber. The space below spring seat 179 is vented through a passage 187 into the chamber which contains the cam follower which, in turn, is drained through a passage 188 into a port 189 connected to the sump. A clutch cylinder drain passage 191 connects to the sump port and cooperates with a land of the valve spool 167. If the torque signal moves the valve spool 167 to the left, the supply of servo oil will be shut off and servo oil will be drained from the clutch through passage 191.

Figure 4:
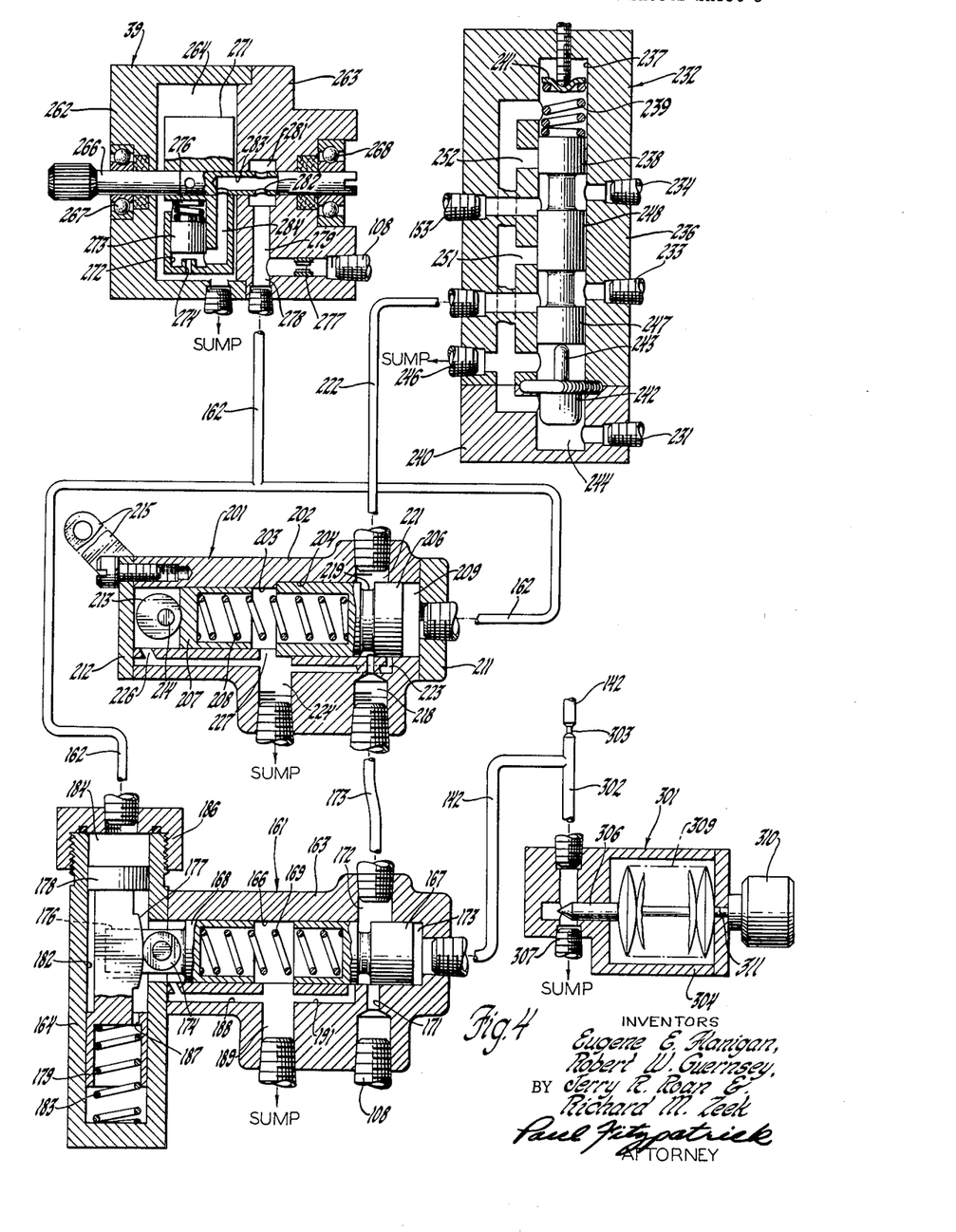
FIGURE 4 is a schematic diagram of a portion of the control system, illustrating the structure of certain elements thereof.

It will be seen that the torque programer valve supplies servo oil to or bleeds it from the clutch 44, thus varying the torque, and the amount of torque transferred is one factor which determines the operation of this valve. The other factor is gasifier speed. Through the action of cam 177, a definite loading of spring 169 is established for each value of gas generator speed. The clutch will therefore be controlled to maintain the transfer shaft torque ouput of the gas generator at a value which is a function of speed related to the characteristics of the particular engine so that turbine temperature is maintained substanially constant at varying power levels. The contouring of the cam may be determined by calculation or experiment for any particular engine. It will be seen that the no torque signal upon torque reversal will always open valve 167 to supply oil to line 173 regardless of engine speed.

The structure so far described, plus lines to conduct the actuating oil to the clutch, constitutes a complete operating system. However, certain additional devices preferably included in the system are illustrated and will now be described. First, acceleration valve 201, interposed in the line from the torque programer to the clutch, which improves the acceleration of the engine. Since the effect of the torque programer is to maintain a high turbine temperature at part loads, there is not much margin for addition of fuel to accelerate the gas generator, both with regard to turbine temperature limits and the compressor surge threshold. The compressor operates closer to the surge line during power transfer. This is desirable to increase running efficiency, but it impedes acceleration. If the engine is running at light load, the gas generator will be turning well below full speed. To assume full load or to accelerate the load rapidly, it is necessary to accelerate the gas generator to full speed. This can be facilitated by temporarily cutting out the power transfer so that all of the power of the gas generator is available to accelerate it. While various means might be adopted, the acceleration valve 201 as illustrated is very simple and suitable for this purpose. This valve responds to substantial power increasing movements of the power control lever 26 to release or unload the power transfer clutch. It is not affected by small or slow movements.

The acceleration valve 201 includes a valve body 202 having a bore 203 coaxial with a second bore 204 of slightly larger diameter. A valve spool 206 slidable in the bore 204 normally abuts the shoulder at the end of the bore. A spring abutment 207 is slidable in the bore 203, and a compression spring 208 is retained between this and the valve spool. Spring 208 biases the spool 206 to the right, as illustrated, in opposition to oil pressure in chamber 209 indicative of gas generator speed supplied from the speed transducer 39 through line 162. Chamber 209 is closed by a head 211 and the other end of the valve body is closed by a head or cap 212. Abutment 207 bears against an eccentric or cam 213 on a shaft 214 rotated in the body by an arm 215. Arm 215 is connected by any suitable means, indicated by the broken line 217 (FIGURE 1) to the throttle or power control lever 26. The throttle setting or gas generator speed request thus, through cam 213, determines the loading of spring 208 biasing valve spool against the pressure in chamber 209 determined by actual gas generator speed. In normal operation of the engine, the speed signal is sufficient to hold the spool against the shoulder in the bore, or substantially in this position. Power transfer clutch control line 173 enters the valve body through a port 218 which aligns with a groove 219 of the valve spool in this position. Communication is thus mainaned between the torque programer and a port 221 of the acceleration valve which connects to a line 222 leading to the power transfer cylinder of clutch 44. An increase in the loading of spring 208 tends to move value spool 206 to the right to bring groove 219 into registry with a bleed port 223 connecting through outlet 224 to the sump. Slight movements of the throttle lever 26 will not shift the valve spool sufficiently to drain the clutch cylinder, but more substantial differences between the speed setting and actual speed will release fluid from the clutch, thus unloading the gas generator and improving its acceleration. The chambers within the bore 203 are vented to the sump through passages 226 and 227.

A further desirable element of the system is a clutch overtemperature valve. The purpose of this valve is to release or relieve the clutching or braking effort in response to too great generation of heat in the clutch. If the clutch should be subjected to too heavy a load at too great a slip rate, excessive heat generation might damage the clutch. For this reason, an automatic valve responsive to the temperature of cooling oil leaving the clutch may be connected in circuit with the brake and clutch cylinder energizing lines. The cooling oil discharged from the clutch through port 96 flows through a line 231 to the clutch overtemperature valve 232 and is discharged from this valve to the sump. The power transfer clutch energizing line 222 enters the valve 232 and is connected through it to a line 233 leading to the clutch. The brake energizing oil line 153 is connected through the overtemperature valve to line 234 which connects with port 86 of the clutch.

The overtemperature valve is simply a balanced spool valve responsive to cooling oil temperature and movable to cut off the two lines which carry servo oil to the clutch. The valve includes a body 236 having a bore 237 within which is mounted the three-land spool 238. The spool is biased in the direction to permit oil flow by a coil spring 239 acting against an adjustable abutment 241. An oil temperature responsive capsule 242 is mounted between the body 236 and a head 240 which closes the valve bore. This capsule is a known temperature-responsive device which includes a pin 243 projected in response to increase in the temperature of the capsule. The capsule is exposed to cooling oil discharged from the clutch through line 231 flowing through a chamber 244 in the head and out to the sump through a port 246. Transfer clutch oil line 222 is throttled and closed by the lower land 247 of the valve upon upward movement thereof. Similarly, the brake-engaging fluid line 153 may be throttled and closed by the middle land 248 of the spool. Upon movement of the valve to cut off flow to the clutch, the clutch cylinders are vented to ports 251 and 252, respectively, which are connected to the drain line 246. The ends of the valve chamber above and below the spool are also drained into the sump. The overtemperature valve is merely a safety device responsive to conditions indicative of possible clutch damage. Such might occur because of misoperation of the engine resulting in very heavy clutch slippage.

It will be appreciated that the need for an overtemperature clutch release will depend upon the nature of the engine installation, controls, and load. Controls may be provided to disengage the clutch in direct response to the rate of slip; that is, the difference in speed of the clutch input and output shafts.

Also, if a load such as a vehicle is driven through a step transmission, the transmission may be downshifted in response to low power turbine speed, or low speed relative to the gas generator, thus permitting the power turbine to increase speed when slip approaches excessive values.

Some means to respond to gas generator speed is necessary in the system of FIGURE 1. One device suitable for this purpose is the speed transducer 39 illustrated in FIGURE 4. This is a known type of centrifugal force responsive throttling valve. As illustrated somewhat schematically, the speed transducer 39 includes a body 262 which has an end cover 263, the two parts defining a chamber 264. A shaft 266 is mounted in the two parts of the body by bearings 267 and 268 suitably sealed. A rotor 271 pinned to the shaft 266 defines a radial valve cylinder 272 within which a cylindrical plug or flyweight 273 is reciprocable. Valve member 273 may approach an outlet 274 from the rotor and is biased toward the outlet by a compression spring 276. Oil from the regulating valve 107 is supplied through line 108 to a port in the body and through an orifice 277 which is of less diameter than outlet 274. After passing through the orifice 277, the oil may flow either from a port 278 into the speed sense line 162 or through a passage 279 to a groove 281 surrounding the shaft 266. Radial ports 282 and a passage 283 in the shaft, and a passage 284 in the rotor conduct the coil to the outer end of cylinder 272. There is normally no significant flow through line 162, but there is flow from the regulated pressure line 108 through the orifices 277 and 274 in series. When the shaft is stationary, the pressure in line 162 is low, as the oil readily escapes through port 274 and from the chamber 264 to the sump. However, as the speed of rotation of the rotor increases, the centrifugal force acting on the valve member 273 moves it outward, throttling port 274 until the pressure in cylinder 272 balances the centrifugal force. Thus, the action of centrifugal force will build up a pressure in line 162 proportional to the square of engine speed.

This particular speed responsive transmitter is merely one of many devices which could be used. Among others which appear desirable for this purpose is the speed sensor disclosed in application Serial No. 2,265 (Patent No. 3,039,315), filed January 13, 1960, of common ownership with this application. It is a dynamic head pickup operating upon the Pitot tube principle within an annulus of oil rotated by the turbine. A centrifugal pump may also be used to develop a speed-responsive pressure. It will be apparent that the general combination is independent of the particular speed responsive device, and that any suitable means for providing a sense of turbine speed to the cam of the torque programer and to the acceleration valve may be employed.

The speed transducer 47 for the power turbine may be of any suitable type, and may be identical to the transducer 39. The transducer 47 receives servo oil through line 108 and transmits a speed pressure through line 291 to the fuel control 23. In an engine incorporating power transfer, the power turbine speed input to the fuel control may be omitted, or it may be retained as an additional safety feature. Also, it may provide a means for controlling the power transfer clutch or shifting the transmission.

With some types of speed sensors, the regulated pressure supply line 108 would not be necessary. For example, the speed transducer described in application Serial No. 2,265 (Patent No. 3,039,315) operates from lubricating oil which is not under pressure.

Another element which may improve this system, under some conditions at least, is means for modifying the schedule of power transfer as a function of air temperature. It is well known that the turbine inlet temperature of a gas turbine engine increases with increases in ambient air temperature. For constant turbine temperature, fuel and therefore power must be reduced as air temperature increases. The system so far described is quite readily modified in one way or another to make the torque transfer schedule a function of ambient temperature, which is desirable to make the gas generator turbine inlet temperature insensitive to ambient temperature. The preferred mode of accomplishing this in the system of FIGURE 1 lies in means for varying the value of torque transmitted from the torque sensor to the torque programer by action of a temperature compensator. The temperature compensator 301 is connected so as to bleed oil from the line 142 through a branch line 302. In addition, if the temperature compensator is employed, a restriction 303 is provided in the line 142 upstream of the branch line 302. Restriction 303 allows a pressure drop to be created in line 142 as oil is bled from it by compensator 301. The compensator 301 includes a body or housing 304 within which the needle valve 306 variably throttles the passage from inlet line 302 to an outlet or sump port 307. This valve needle is reciprocated by a stack of dished bimetal disks 309, a known temperature responsive device. The bimetal elements 309, if they are exposed to ambient atmospheric or engine inlet temperature, move to open the valve and thus reduce the torque sense by the additional drop through orifice 303 as air temperature decreases. By thus reducing the torque sense, the valve spool 167 closes off the supply of pressure oil to the power transfer clutch at a higher value of torque as air temperature decreases. The result is that the level of power transfer varies reversely to inlet or ambient air temperature.

If desired, the temperature compensator 301 may include means for adjusting its action represented by the rotatable knob 310 on a shaft 311 threaded in the housing 301, which may shift the stack of bimetal disks and the needle valve axially, thus adjusting the turbine temperature setting of the temperature-responsive valve.

This completes the description of the structure of the system of FIGURE 1 and its elements. The operation should be clear from the foregoing, but it may be desirable to review the operation briefly and, in so doing, to refer to the curves of FIGURES 5 to 8. Assume that the engine is running normally, for example, at a minimum idling power level; the gas generator turbine 13 drives the auxiliaries including the speed transducer 39. Under these idling conditions, a little gas horsepower is available to the power turbine, and it may rotate idly or may be stationary, if the load is coupled to it. The power transfer clutch 44 will be open. To extract substantial power from the engine, the gas generator must be accelerated by increasing the fuel rate so as to provide more gas energy to the power turbine. Above a low idle speed, the control system begins, through cam 177, to engage the power transfer clutch.

Figure 5:
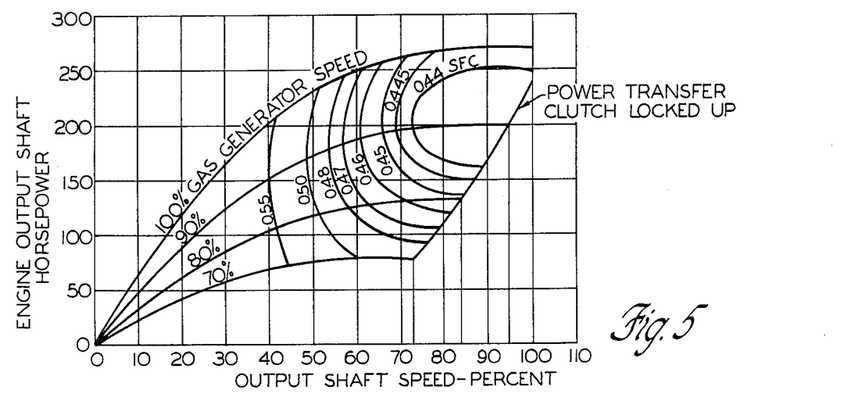
FIGURE 5 is a typical map of overall performance of an engine as in FIGURE 1.

The nature of the characteristic for a typical 265 H.P. engine with power transfer is shown in FIGURE 5. It will be noted that the output shaft horsepower is relatively low below 70% gas generator speed but increases rapidly in the higher range of gas generator speed up to 100%, which is the normal maximum gas generator speed. The power also increases with power turbine speed but levels off at the higher power turbine speeds. The line indicated as "power transfer clutch locked up" represents the condition under which the power turbine tends to overrun the gas generator turbine and the power transfer clutch is strongly engaged to brake the power turbine, and thus the load. To the left of this line, the power transfer clutch slips under controlled torque. The curves of FIGURE 5 also include lines of specific fuel consumption, from which it will be apparent that very good values of specific fuel consumption are maintained down to relatively low output shaft speeds and power output.

The effect of power transfer on fuel economy of the engine is also illustrated by FIGURE 6, in which the solid line illustrates variation in specific fuel consumption with horsepower output, and the dotted line shows the variation in fuel consumption in an otherwise identical engine lacking the power transfer feature. The much lower fuel consumption at part load with power transfer is apparent.

Figures 7, 9:
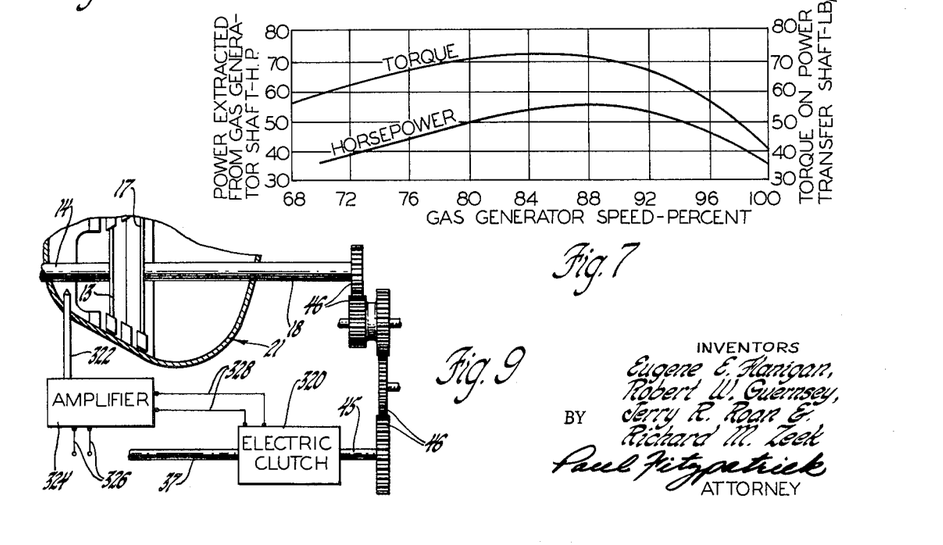
FIGURE 7 is a diagram of power transfer characteristics of a typical engine.
FIGURE 9 is a partial schematic diagram illustrating control of power transfer directly by turbine temperature.

The order of magnitude of power transfer in an engine of this size can be seen in FIGURE 7, which illustrates by the curves the amount of horsepower transferred, including that directed to the auxiliaries, and the torque. The actual value of torque will depend, of course, upon the overall ratio of the gearing between the turbine shaft and the power transfer clutch. This particular curve is for a 6.9 to 1 ratio of gas producer speed to clutch speed. The effect of this power transfer on turbine inlet temperature is illustrated for this typical engine in FIGURE 8. As will be seen, the turbine inlet temperature will remain constant at 1700° over a range of gas producer speed down to 60%, whereas, without power transfer, it falls off rapidly and is down to 1250° at 70% gas producer speed.

When the temperature is kept at the high level, the efficiency of the engine is greatly improved. The speed of the gas generator decreases and, with it, the compression ratio, but maintenance of the high temperature prevents the normal increase in specific fuel consumption. The power taken from the gas generator turbine is, of course, usable to propel a vehicle or drive any other load. This system is particularly advantageous with regenerative gas turbines, since the efficiency of a regenerative engine is not sensitive to compressor pressure ratio. However, it is useful in a non-regenerative engine, although not to such a great extent.

It is ordinarily desirable, when power transfer is controlled by a measurement of mechanical power delivered by the gas generator, that this measurement include auxiliary power. Usually, the power required for auxiliaries is significant and is variable. If the auxiliary power load is not taken into account, measurement of power transfer torque affords a less accurate means of holding turbine temperature at the desired point. However, if the auxilary load is constant or is insignificant—for example, auxiliaries could be driven by an independent power source—then it is not necesary to include auxiliary torque in the measurement of torque used to control the power transfer clutch. It should also be borne in mind that power transfer may be controlled by other means, as for example, directly by turbine temperature, in which case no measurement of torque is required. Other factors might be used to control transfer of power, the point being that the power transfer is controlled so that sufficient power is taken from the gas generator to keep the normal high full load operating temperature down to low values of load. In fact, it is feasible to increase turbine temperature slightly at low power where rotational speed and therefore stresses are lower.

Referring specifically to the system of FIGURE 1, in the operation of the engine the power level is determined by the manual lever 26 which controls fuel supply. The power transfer clutch extracts some power from the gas generator turbine and assists the power turbine in driving the load through transmission 20. The speed of the gas generator is measured by the transducer 39 which may provide a speed signal to the fuel control and provides a speed signal to the torque programer 161 and the acceleration valve 201. The torque sensor 111 provides a torque signal through line 142 to the torque programer, which signal may be trimmed or compensated for air temperature by the temperature compensator valve 301, if it is provided. The torque programer acts to control the pressure of fluid to the power transfer clutch, adjusting the pressure so that the torque extracted from the gas generator equals that programed or scheduled by the torque programer as a function of engine speed.

Since, in the embodiment of the invention described above, the amount of torque load which may be assumed by the gas generator is determined as a function of the speed of the gas generator, it is necessary to control the power transfer clutch to transfer an amount of torque which is a function of the speed of the gas generator. This relation is indicated by the torque curve in FIGURE 7. Therefore, the torque sensor measures the torque taken from the gas generator, the speed transducer measures the speed of the gas generator, and the torque programer adjusts the friction of the power transfer clutch to make the torque derived from the gas generator equal that scheduled as a function of gas generator speed. Specifically, this speed schedule is embodied in the contour of the cam 177 of the torque programer which, in effect, provides an input of desired torque into the programer which in turn adjusts the clutch oil pressure to make the torque output equal that desired.

Since the high gas temperature under power transfer inhibits rapid increase in power capacity of the engine, an acceleration valve 201 is desirable in many cases to disengage, or reduce the torque transmitted by, the power transfer clutch so that fuel supplied to the gas generator may accelerate it to a higher speed consonant with a higher engine output level. The acceleration valve acts in response to substantial differences between the speed called for by the control 26 and the actual speed of the gas generator. It may also be desirable to provide the clutch overtemperature valve 232 to relieve the pressure on the clutch in case of overheating.

In many cases, it is also highly desirable to provide positive means to brake the load and also to provide a positive restraint on overspeed of the power turbine when there is no load or upon disengagement of the turbine from the load, for instance. This is accomplished through the same power transfer clutch by energizing it in response to overrunning of the gas generator by the power turbine, or power flow from the power turbine back to the gas generator, so that the compressor 11 can be driven by the shaft 18. The amount of reverse torque transmitted during braking ordinarily needs to be limited, out of regard to the strength of the transfer gear installation. Obviously, the ratio of speeds of the two turbines during braking may be any appropriate value, as the ratio of the gears coupling the turbine shafts to the clutch may be as desired.

While the slipping clutch is not the most efficient means to transfer power from the gas generator to the load, since any slip represents some power loss, its simplicity, reliability, and ease of control recommend it. Obviously, there are many types of power transmission devices which can be controlled in response to a signal directly or indirectly representing a factor such as input torque, engine temperature, engine speed, or the like, so as to transfer torque to the extent to maintain gas generator turbine temperature at a high level conductive to best efficiency and which permit variations in the speed ratio of the two turbines.

In this connection, FIGURE 9 is a fragmentary view of a portion of the same engine as FIGURE 1, but illustrating an electrically controlled or operated clutch 320 connecting shafts 37 and 45. Such a clutch might be a magnetic particle clutch, a slip clutch engaged magnetically, an electrically controlled servo-operated clutch, or various known types of electrodynamic power transmission mechanisms. Such a clutch might be controlled in response to engine speed and torque as described in connection with FIGURE 1, but, in FIGURE 9, it is shown as controlled in response to temperature of the motive fluid measured by one or more thermocouples 322 in the turbine inlet. As is well known, turbine temperature may also be measured in the turbine exhaust. Such thermocouples may operate through voltage and power amplifier devices indicated by the amplifier 324 to control substantial amounts of power. As indicated, the amplifier is energized from a current source through lines 326, is controlled by thermocouple 322, and supplies power through lines 328 to control the clutch 320. It is clear that a temperature measuring device also could control a hydraulic clutch. Electrically controlled pressure regulating valves are known; also, temperature responsive pressure regulating valves which might respond directly to turbine temperature. However, measurement of turbine temperature is not as satisfactory for our purposes as measurement of speed and torque, because of the long response time of most temperature sensitive devices, and for other reasons.

The foregoing description of preferred embodiments of our invention will make its principles and advantages clear. This description is not to be construed as limiting the scope of the invention, as many modifications of structure and organization may be made within the principles thereof.

We claim:

1. A gas turbine power plant comprising, in combination, a gas generator including a compressor, combustion apparatus, and a turbine driving the compressor, a load turbine gas-coupled to the gas generator, controllable torque-transmitting means coupling the turbines including means controlling the amount of torque transmitted, and means responsive to a condition of the gas generator indicative of torque available from the gas generator as shaft power within allowable limits of gas generator turbine temperature connected to said torque controlling means to control the torque transmitted so as to load the gas generator turbine variably with decrease in engine power level to maintain a high gas generator turbine temperature at light loads.

2. A power plant as recited in claim 1 in which the torque-transmitting means includes a slip clutch and the means to control the torque transmitted varies the torque capacity of the clutch.

3. A power plant as recited in claim 1 in which the said condition is gas generator turbine speed.

4. A power plant as recited in claim 1 in which the said condition is turbine motive fluid temperature.

5. A power plant as recited in claim 1 including a heat exchanger connected to transfer heat from the turbine exhaust to the compressor discharge air.

6. A power plant as recited in claim 1 including means for controlling engine fuel supply and means responsive to movement of the fuel controlling means to accelerate the gas generator coupled to the torque-transmitting means so as to temporarily reduce the torque transmitted and thereby facilitate acceleration of the gas generator.

7. A gas turbine power plant comprising, in combination, a gas generator including a compressor, combustion apparatus, and a turbine driving the compressor, a load turbine gas-coupled to the gas generator, controllable torque-transmitting means coupling the turbines including means controlling the amount of torque transmitted, and means responsive to a condition of the gas generator indicative of torque available from the gas generator as shaft power within allowable limits of gas generator turbine temperature connected to said torque controlling means to control the torque transmitted so as to load the gas generator turbine variably with decrease in engine power level to maintain a high gas generator turbine temperature at light loads, brake control means operative to control the torque-transmitting means to a torque level sufficient for substantial braking of the load turbine, and means responsive to transfer of torque from the load turbine to the gas generator turbine effective to operate the brake control means.

8. A power plant as recited in claim 7 in which the torque-transmitting means includes a slip clutch and the means to control the torque transmitted varies the torque capacity of the clutch.

9. A gas turbine power plant comprising a first turbine, a compressor driven thereby, a power output second turbine rotatable independently of and in motive fluid circuit with the first turbine, means including combustion apparatus connecting the compressor to the turbines, and manually settable fuel supply and regulating means connected to the combustion apparatus, in combination with power transfer means mechanically interconnecting the turbines, the power transfer means comprising a controllable variable-ratio torque-transmitting coupling having an input element constantly coupled to the first turbine for rotation therewith and an output element constantly coupled to the second turbine for rotation therewith, a torquemeter connected to measure torque delivered by the first turbine to the input element, torque scheduling means responsive to a condition of engine operation indicative of surplus torque available from the first turbine at normal rated temperature, and coupling control means responsive to the torquemeter and the scheduling means and operable upon the coupling to vary the torque transmitted thereby to balance the torque delivered with the torque available.

10. A power plant as recited in claim 9 including a heat exchanger connected to transfer heat from the turbine exhaust to the compressor discharge air.

11. A power plant as recited in claim 9 including engine auxiliaries driven by the first turbine and in which the torquemeter is connected to measure a torque including that delivered to the said auxiliaries.

12. A power plant as recited in claim 9 in which the torque-transmitting coupling is a variably loadable friction clutch.

13. A gas turbine power plant comprising a first turbine, a compressor driven thereby, a power output second turbine rotatable independently of and in motive fluid circuit with the first turbine, means including combustion apparatus connecting the compressor to the turbine, and manually settable fuel supply and regulating means connected to the combustion apparatus, in combination with power transfer means mechanically interconnecting the turbines, the power transfer means comprising a controllable variable-ratio torque-transmitting coupling having an input element constantly coupled to the first turbine for rotation therewith and an output element constantly coupled to the second turbine for rotation therewith, a torquemeter connected to measure torque delivered by the first turbine to the input element, torque scheduling means responsive to a condition of engine operation indicative of surplus torque available from the first turbine at normal rated temperature, coupling control means responsive to the torquemeter and the scheduling means and operable upon the coupling to vary the torque transmitted thereby to balance the torque delivered with the torque available, and acceleration override means responsive to a condition indicative of a substantial engine acceleration signal connected to the coupling effective to reduce the torque transmitted thereby during said condition.

14. A gas turbine power plant comprising a first turbine, a compressor driven thereby, a power output second turbine rotatable independently of and in motive fluid circuit with the first turbine, means including combustion apparatus connecting the compressor to the turbines, and manually settable fuel supply and regulating means connected to the combustion apparatus, in combination with power transfer means mechanically interconnecting the turbines, the power transfer means comprising a controllable variable-ratio torque-transmitting coupling having an input element constantly coupled to the first turbine for rotation therewith and an output element constantly coupled to the second turbine for rotation therewith, a torquemeter connected to measure torque delivered by the first turbine to the input element, torque scheduling means responsive to a condition of engine operation indicative of surplus torque available from the first turbine at normal rated temperature, coupling control means responsive to the torquemeter and the scheduling means and operable upon the coupling to vary the torque transmitted thereby to balance the torque delivered with the torque available; and means responsive to an ambient condition indicative of engine power capability effective to modulate the torque transmitted as a function of the said ambient condition.

15. A gas turbine power plant comprising a first turbine, a compressor driven thereby, a power output second turbine rotatable independently of and in motive fluid circuit with the first turbine, means including combustion apparatus connecting the compressor to the turbines, and manually settable fuel supply and regulating means connected to the combustion apparatus, in combination with power transfer means mechanically interconnecting the turbines, the power transfer means comprising a controllable variable-ratio torque-transmitting coupling having an input element constantly coupled to the first turbine for rotation therewith and an output element constantly coupled to the second turbine for rotation therewith, a torquemeter connected to measure torque delivered by the first turbine to the input element, torque scheduling means responsive to a condition of engine operation indicative of surplus torque available from the first turbine at normal rated temperature, coupling control means responsive to the torquemeter and the scheduling means and operable upon the coupling to vary the torque transmitted thereby to balance the torque delivered with the torque available; braking control means in the torquemeter responsive to torque transmitted from the second turbine to the first turbine through the coupling, and means actuated by the braking control means to control the torque capacity of the coupling to a value substantially higher than the greatest aforementioned excess torque to provide for braking the second turbine by power transfer to the compressor.

16. A gas turbine power plant comprising a first turbine, a compressor driven thereby, a power output second turbine rotatable independently of and in motive fluid circuit with the first turbine, means including combustion apparatus connecting the compressor to the turbines, and manually settable fuel supply and regulating means connected to the combustion apparatus, in combination with power transfer means mechanically interconnecting the turbines, the power transfer means comprising a controllable variable-ratio torque-transmitting coupling having an input element constantly coupled to the first turbine for rotation therewith and output element constantly coupled to the second turbine for rotation therewith, a torquemeter connected to measure torque delivered by the first turbine to the input element, torque scheduling means responsive to a condition of engine operation indicative of surplus torque available from the first turbine at normal rated temperature, coupling control means responsive to the torquemeter and the scheduling means and operable upon the coupling to vary the torque transmitted thereby to balance the torque delivered with the torque available; acceleration override means responsive to a condition indicative of a substantial engine acceleration signal connected to the coupling effective to reduce the torque transmitted thereby during said condition; means responsive to an ambient condition indicative of engine power capability effective to modulate the torque transmitted as a function of the said ambient condition; braking control means responsive to overrunning of the first turbine by the second turbine, and means actuated by the braking control means operable to control the torque capacity of the coupling to a value substantially higher than the greatest aforementioned excess torque to provide for braking the second turbine by power transfer to the compressor.

17. A gas turbine engine of the shaft power output type comprising, in combination, a power output turbine having a power output shaft; a gas generator including a compressor, combustion apparatus supplied by the compressor, and a turbine energized by the combustion apparatus connected to drive the compressor, the gas generator supplying motive fluid to the power output turbine; means for controllably supplying fuel to the combustion apparatus, the rate of fuel supply determining the output of the gas generator and thereby the energy level of the power output turbine; and means for transferring mechanical energy from the gas generator turbine to the power output shaft so as to maintain turbine temperature of the gas generator substantially constant over a wide range of energy levels of the power output turbine, the last-recited means including a torque-transmitting coupling of an impositive type allowing progressive variation in the relative speeds of the two turbines, and means responsive to a condition of the gas generator indicative of gas generator turbine energy level controlling the magnitude of the torque transmitted by the coupling.

18. A gas turbine engine of the shaft power output type comprising, in combination, a power output turbine having a power output shaft; a gas generator including a compressor, combustion apparatus supplied by the compressor, and a turbine energized by the combustion apparatus connected to drive the compressor, the gas generator supplying motive fluid to the power output turbine; means controllably supplying fuel to the combustion apparatus, the rate of fuel supply determining the output of the gas generator and thereby the energy level of the power output turbine; and means for transferring mechanical energy from the gas generator turbine to the power output shaft so as to maintain turbine temperature of the gas generator substantially constant over a wide range of energy levels of the power output turbine, the last mentioned means comprising an impositive torque-transmitting coupling between the turbines, a transfer control operable to progressively vary the energy transferred by the coupling, and means responsive to a condition of the gas generator indicative of gas generator turbine temperature coupled to the transfer control to control the energy transferred so as to main substantially full-load gas generator temperature as the energy level of the power output turbine decreases from the full-load level.

19. A gas turbine engine of the shaft power output type comprising, in combination, a power output turbine having a power output shaft; a gas generator including a compressor, combustion apparatus supplied by the compressor, and a compressor turbine energized by the combustion apparatus connected to drive the compressor, the compressor turbine being of sufficient capacity to drive the compressor at maximum rated speed and having excess capacity at lower speeds of the compressor, the gas generator supplying motive fluid to the power output turbine; means for controllably supplying fuel to the combustion apparatus, the rate of fuel supply determining the output of the gas generator to the power output turbine; and means for transferring mechanical energy from the compressor turbine to the power output shaft so as to maintain compressor turbine temperature substantially constant over a wide range of energy levels of the power output turbine, the last-recited means including a torque-transmitting coupling of an impositive type between the turbines allowing progressive variation in the relative speeds of the two turbines, a transfer control operable to vary progressively the torque transferred by the coupling, and means responsive to a condition of the gas generator indicative of compressor turbine excess torque capacity as limited by compressor turbine temperature coupled to the transfer control too control the energy transferred so as to maintain substantially full-load compressor turbine temperature as the energy of the power output turbine decreases from the full-load level.

20. A gas turbine engine of the shaft power output type comprising, in combination, a power output turbine having a power output shaft; a gas generator including a compressor, combustion apparatus supplied by the compressor, and a compressor turbine energized by the combustion apparatus connected to drive the compressor, the compressor turbine being of sufficient capacity to drive the compressor at maximum rated speed and having excess capacity at lower speeds of the compressor, the gas generator supplying motive fluid to the power output turbine; means for controllably supplying fuel to the combustion apparatus, the rate of fuel supply determining the output of the gas generator to the power output turbine; and means for transferring mechanical energy from the compressor turbine to the power output shaft so as to maintain compressor turbine temperature substantially constant over a wide range of energy levels of the power output turbine, the last-recited means including a torque-transmitting coupling of an impositive type between the turbines allowing progressive variation in the relative speeds of the two turbines, a transfer control operable to vary progressively the torque transferred by the coupling, and means responsive to a condition of the gas generator indicative of compressor turbine excess torque capacity as limited by compressor turbine temperature and to the torque transmitted coupled to the transfer control to control the energy transferred so as to maintain substantially full-load compressor turbine temperature as the energy level of the power output turbine decreases from the full-load level.

21. An open-circuit gas turbine engine of the shaft power output type comprising, in combination, a power output turbine having a power output shaft; a gas generator including a compressor, combustion apparatus supplied by the compressor, and a compressor turbine energized by the combustion apparatus connected to drive the compressor, the compressor turbine being of sufficient capacity to drive the compressor at maximum rated speed and having excess capacity at lower speeds of the compressor, the gas generator supplied motive fluid to the power output turbine; means for controlled supplying fuel to the combustion apparatus, the rate of fuel supply determining the output of the gas generator to the power output turbine; and means for transferring mechanical energy from the compressor turbine to the power output shaft so as to maintain compressor turbine temperature substantially constant over a wide range of energy levels of the power output turbine, the last-recited means including a torque-transmitting coupling of an impositive type between the turbines allowing progressive variation in the relative speeds of the two turbines, a transfer control operable to vary progressively the torque transferred by the coupling, and means responsive to a condition of the gas generator indicative of compressor turbine excess torque capacity as limited by compresssor turbine temperature coupled to the transfer control to control the energy transferred so as to maintain substantially full-load compressor turbine temperature as the energy level of the power output turbine decreases from the full-load level.

22. An open-circuit gas turbine engine of the shaft power output type comprising, in combination, a power output turbine having a power output shaft; a gas generator including a compressor, combustion apparatus supplied by the compressor, and a compressor turbine energized by the combustion apparatus connected to drive the compressor, the compressor turbine being of sufficient capacity to drive the compressor at maximum rated speed and having excess capacity at lower speeds of the compressor, the gas generator supplied motive fluid to the power output turbine; means for controllably supplying fuel to the combustion apparatus, the rate of fuel supply determining the output of the gas generator to the power output turbine; and means for transferring mechanical energy from the compressor turbine to the power output shaft so as to maintain compressor turbine temperature substantially constant over a wide range of energy levels of the power output turbine, the last-recited means including a torque-transmitting coupling of an impositive type between the turbines allowing progressive variation in the relative speeds of the two turbines, a transfer control operable to vary progressively the torque transferred by the coupling, and means responsive to a condition of the gas generator indicative of compressor turbine excess torque capacity as limited by compressor turbine temperature and to the torque transmitted coupled to the transfer control to control the energy transferred so as to maintain substantially full-load compressor turbine temperature as the energy level of the power output turbine decreases from the full-load level.

References Cited by the Examiner

UNITED STATES PATENTS

| | | | |
|---|---|---|---|
| 1,928,301 | 9/1933 | Pierson | 192—133.2 |
| 2,374,510 | 4/1945 | Traupel | 60—49 |
| 2,802,334 | 8/1957 | Fletcher et al. | 60—39.16 |

FOREIGN PATENTS

| | | |
|---|---|---|
| 723,368 | 2/1955 | Great Britain. |
| 231,559 | 10/1945 | Switzerland. |
| 413,679 | 7/1934 | Great Britain. |
| 415,788 | 9/1934 | Great Britain. |

JULIUS E. WEST, *Primary Examiner*.